United States Patent Office 3,048,630
Patented Aug. 7, 1962

3,048,630
AMINO DERIVATIVES OF PYROPHOSPHORIC ACID AND PROCESS OF MAKING THE SAME
Margot Becke, Heidelberg, Germany, assignor to Olin Mathieson Chemical Corporation, a corporation of Virginia
No Drawing. Filed Feb. 15, 1957, Ser. No. 640,312
Claims priority, application Germany Feb. 21, 1956
7 Claims. (Cl. 260—545)

The invention relates to the production of amino derivatives of pyrophosphoric acid being useful as intermediates for flame retarding agents and plastics and more particularly to products made by converting the tetrachloride of pyrophosphoric acid with ammonia or derivatives thereof.

Heretofore a few substituted tetra-amides have been made by converting the di-alkylamide of monochloro-phosphoric acid with the di-alkylamide of ethyl phosphate. This process, however, cannot be used for the preparation of the unsubstituted tetra-amide of pyrophosphoric acid because the di-amide of mono-chloro-phosphoric acid is unknown. Also the direct action of ammonia did not result in this desired product.

It is an object of the present invention to provide a new method of preparing either substituted or unsubstituted amides of pyrosphoric acid, thereby obtaining good yields.

It is a further object of this invention to completely separate the resulting tetra-amides from by-products formed during the reaction of the initial materials.

It is a still further object of this invention to cut down the amount of such by-products to a negligible percentage.

Other objects of this invention will be apparent from the appended claims and the following specification which describes, by way of example, some preferred embodiments of the invention.

As briefly mentioned above, the unsubstituted tetra-amide of pyrophosphoric acid cannot be obtained from the tetrachloride of pyrophosphoric acid by the application of gaseous ammonia. It was rather suspected that the action of ammonia to pyrophosphoryl-chloride results in a cleavage of the P—O—P bond under formation of substituted phosphoric acid triamides. However, it was found that good yields of the tetra-amide of pyrophosphoric acid can be obtained if liquefied ammonia reacts with the tetrachloride of pyrophosphoric acid, and certain conditions are strictly adhered to. This means that the starting material must absolutely be free from any traces of water. It is further necessary to add stoichiometrical amounts of pyrophosphoryl-chloride to the liquid ammonia or amine slowly and dropwise.

If the pyrophosphoryl-chloride is not added dropwise but all at once and in an amount being somewhat less than stoichiometrically required, the reaction does not stop when the tetra-amide has formed. In this case, a new P—N—P bond is formed under polymerization. The resulting product is believed to have the following structure.

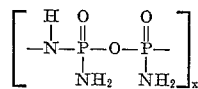

Care must be taken also in this case to strictly exclude any traces of water.

This substance can be isolated by washing out ammonium chloride with water or liquid ammonia. In this case, the substances takes up ammonia which becomes apparent by a change of the composition from $[P_2O_3N_3H_5]_x$ to $[P_2O_3N_4H_8]_x$. This product can also be obtained by reacting isolated $[P_2O_3N_3H_5]_x$ with surplus liquid ammonia.

The starting materials may react in the above identified sense in or without the presence of a water-free solvent. A solvent is only advisable if the starting material is a derivative of ammonia, such as dimethylamine or diethylamine and the like. In the case of liquid ammonia no solvent is necessary because in this case the ammonia acts both as agent and as solvent.

Without limiting the invention, the following examples are given to illustrate the preferred mode of this procedure:

*Example I*

Tetra-amide of pyrophosphoric acid: About 150 cc. of dry ammonia are liquefied in a condenser tube. Then 25 g. of tetrachloride of pyrophosphoric acid are quickly added dropwise. An exothermic reaction occurs and part of the ammonia evaporates and ammonium chloride vapors are given off. When the reaction has ceased the product is filtered through a G–3-frit. The residue is washed until it is free from chloride. The yield is about 15 g. of the tetra-amide of pyrophosphoric acid (87–89%).

*Example II*

Tetra-dimethyl-amide of pyrophosphoric acid: 400 cc. of absolutely dry ether are cooled down to −40° C. in a 2 l. flask, fitted with a dropping funnel and a potassium hydroxide tube; then 70 cc. of dry dimethylamine are allowed to dissolve. The dropping funnel is filled with a solution of 80 cc. of absolutely dry ether and 10 cc. of the tetrachloride of pyrophosphoric acid. While the mixture is being stirred and cooled constantly, the solution of the pyrophosphoryl-chloride is added dropwise within a time of about 90 minutes. Then the solution is stirred for another 30 minutes without cooling. After distilling off excess dimethylamine and ether, precipitated dimethylamine-hydrochloride is filtered with suction. The yield is 17 g. of a slightly yellow liquid. Redistillation may permit recovery of 16 g. of colorless tetra-methyl-amide of pyrophosphoric acid which boils at 130°/0.8 mm.

*Example III*

150 cc. of absolutely water-free dimethylamine are cooled down to −70° C. Then 8 cc. of the tetrachloride of pyrophosphoric acid are slowly added dropwise. After distilling off excess dimethylamine, the also formed dimethylamine-hydrochloride is removed by filtering. The thus resulting filtrate is distilled. Yield: 13 g. of the dimethylamide of pyrophosphoric acid.

*Example IV*

Some dry ammonia is liquefied in a condenser tube being surrounded by $CO_2$ Dry Ice or liquid air. Then somewhat less than the theoretical amount of $P_2O_3Cl_4$ is added rapidly all at once. After driving off excess ammonia, ammonium chloride is washed out with water. A polymeric phosphorus-nitrogen containing product of the formula $[P_2O_3N_3H_5]_x$ is obtained.

*Example V*

The same procedure as set forth in Example IV is followed with the exception that the formed ammonium-chloride is removed by washing with liquid ammonia. In this case, a polymeric phosphorus-nitrogen containing product of the formula $[P_2O_3N_4H_8]_x$ results.

While this invention has been described and illustrated by the examples shown, it is not intended to be strictly limited thereto, and other modifications and variations may be employed within the scope of the following claims.

I claim:
1. In a process for the production of the tetra-amide of pyrophosphoric acid, the steps of adding dropwise and under anhydrous conditions pyrophosphoric acid tetrachloride to an excess of liquid ammonia, filtering the re- action mixture, and washing the filtered residue with liquid ammonia to remove ammonium chloride.

2. In a process for the production of tetra-amides of pyrophosphoric acid, the steps of adding dropwise pyrophosphoric acid tetrachloride to an excess of a member selected from the group consisting of liquid ammonia and dialkylamines at a temperature not exceeding the boiling point of liquified ammonia and reacting the mixture under anhydrous conditions.

3. In a process for the production of tetra-amides of pyrophosphoric acid, the steps of adding dropwise pyrophosphoric acid tetracholride to an excess of a member selected from the group consisting of liquid ammonia and dialkylamines at a temperature between about −40° C. and about −70° C. and reacting the mixture under anhydrous conditions.

4. In a process for the production of the tetradimethylamide of pyrophosphoric acid, the step of adding dropwise and under anhydrous conditions pyrophosphoric acid tetrachloride to an excess of liquid dimethylamine at a temperature not exceeding about −40° C.

5. In a process for the production of the tetra-amide of pyrophosphoric acid, the steps of adding dropwise and under anhydrous conditions pyrophosphoric acid tetrachloride to an excess of liquid ammonia and washing the resulting amide with water to remove ammonium chloride.

6. In a process for the production of the tetradimethylamide of pyrophosphoric acid, the step of adding dropwise and under anhydrous conditions pyrophosphoric acid tetrachloride at a temperature not exceeding −40° C. to an excess of dimethylamine dissolved in an anhydrous solvent.

7. In a process for the production of polymeric compounds containing phosphorus and nitrogen, the steps of adding less than the stoichiometrically required amount of the tetrachloride of pyrophosphoric acid all at once to liquified ammonia, driving off excess ammonia, and washing the resulting polymer with a washing agent selected from the group consisting of water and liquid ammonia.

References Cited in the file of this patent
UNITED STATES PATENTS 2,758,956    Shalit et al. _____ Aug. 14, 1956

OTHER REFERENCES

Klement et al.: Zeit. Anorg. u. Allgem. Chem., 282, 149–61 (1955).